United States Patent
Nadherny et al.

(10) Patent No.: US 7,435,044 B2
(45) Date of Patent: Oct. 14, 2008

(54) REMOVABLE RUB RAIL SYSTEM FOR RAILWAY CARS

(75) Inventors: Rudolph E. Nadherny, Golden, MO (US); David R. Early, Carol Stream, IL (US)

(73) Assignee: Ireco, LLC, Bensenville, IL (US)

( * ) Notice: Subject to any disclaimer, the term of this patent is extended or adjusted under 35 U.S.C. 154(b) by 407 days.

(21) Appl. No.: 11/116,838

(22) Filed: Apr. 28, 2005

(65) Prior Publication Data

US 2006/0245840 A1 Nov. 2, 2006

(51) Int. Cl.
*B61D 45/00* (2006.01)
(52) U.S. Cl. .................................... 410/115
(58) Field of Classification Search ............... 410/115, 410/101, 96
See application file for complete search history.

(56) References Cited

U.S. PATENT DOCUMENTS

| | | | |
|---|---|---|---|
| 2,716,382 A | 8/1955 | Johnson | |
| 2,716,383 A | 8/1955 | Johnson | |
| 2,716,384 A | 8/1955 | Johnson | |
| 2,759,432 A * | 8/1956 | Adler | 410/113 |
| 2,839,013 A | 6/1958 | Gunnell et al. | |
| 2,882,837 A * | 4/1959 | Methe et al. | 410/114 |
| 2,905,108 A * | 9/1959 | Abel | 410/114 |
| 2,939,406 A * | 6/1960 | Wilkoff | 410/115 |
| 2,987,014 A * | 6/1961 | Sleeman | 105/404 |
| 2,989,010 A | 6/1961 | Wilkoff | |
| 3,071,086 A * | 1/1963 | Dunlap | 410/146 |
| 3,089,436 A * | 5/1963 | Buckley | 410/109 |
| 3,179,068 A | 4/1965 | Jensen | |
| 3,709,157 A | 1/1973 | Snyder et al. | |
| 3,769,917 A | 11/1973 | Snyder et al. | |
| 3,788,240 A | 1/1974 | Nadherny | |
| 3,853,071 A | 12/1974 | Snyder et al. | |
| 4,062,297 A | 12/1977 | Snyder et al. | |
| 4,064,810 A | 12/1977 | Jenkins et al. | |
| 4,266,897 A | 5/1981 | Jensen | |
| 4,846,610 A * | 7/1989 | Schoenleben | 410/96 |
| 5,752,791 A * | 5/1998 | Ehrlich | 410/101 |
| 5,934,849 A | 8/1999 | Haire | |
| 6,302,031 B1 | 10/2001 | Smith et al. | |
| 6,402,446 B1 * | 6/2002 | Nadherny et al. | 410/100 |
| D465,176 S | 11/2002 | Grandy | |
| 6,481,941 B2 | 11/2002 | Nadherny et al. | |
| 6,626,622 B2 * | 9/2003 | Zubko | 410/113 |
| 6,655,886 B2 * | 12/2003 | Grandy | 410/112 |
| 6,824,341 B2 * | 11/2004 | Ehrlich | 410/150 |
| 6,893,075 B2 * | 5/2005 | Fenton et al. | 296/181.1 |
| 7,004,080 B2 * | 2/2006 | Creighton et al. | 105/404 |

(Continued)

*Primary Examiner*—H Gutman
(74) *Attorney, Agent, or Firm*—Cook Alex Ltd.

(57) ABSTRACT

A removable adapter system allows a freight car sidewall with lading tie anchors to accommodate rub rails for cargo transportation and to remove the rub rails when desired. Bolts specially configured to fit between a lading tie anchor and the associated indentation in the sidewall are spaced apart for aligning vertical strips. The vertical strips include a plurality of attachment members which hold rub rails that run from at or spaced from the front or back wall of the freight car to at or spaced from the door opening. The adapter system can be applied and removed with standard hand tools, so the sidewall is easily changed from a lading tie anchor system to a rub rail system and back to a lading tie anchor system.

21 Claims, 6 Drawing Sheets

U.S. PATENT DOCUMENTS 7,100,971 B2 * 9/2006 Pines ..................... 296/186.1
7,134,820 B2 * 11/2006 Ehrlich ..................... 410/150
7,261,044 B2 * 8/2007 Creighton et al. ........... 105/404
7,305,923 B2 * 12/2007 Creighton et al. ........... 105/404

* cited by examiner

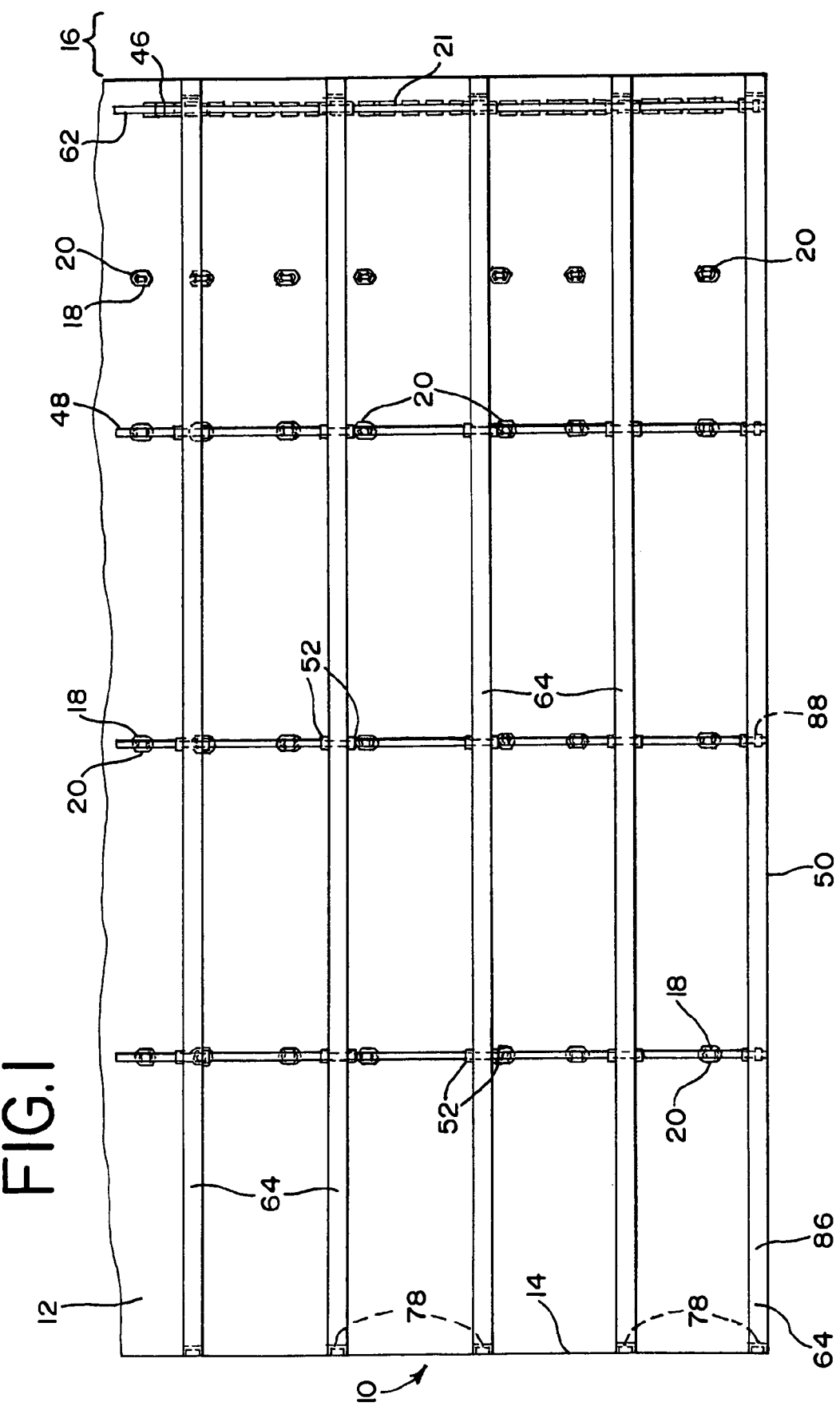

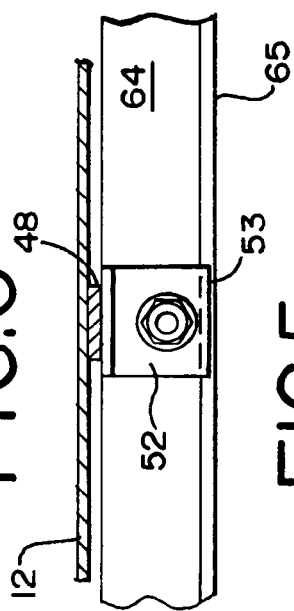
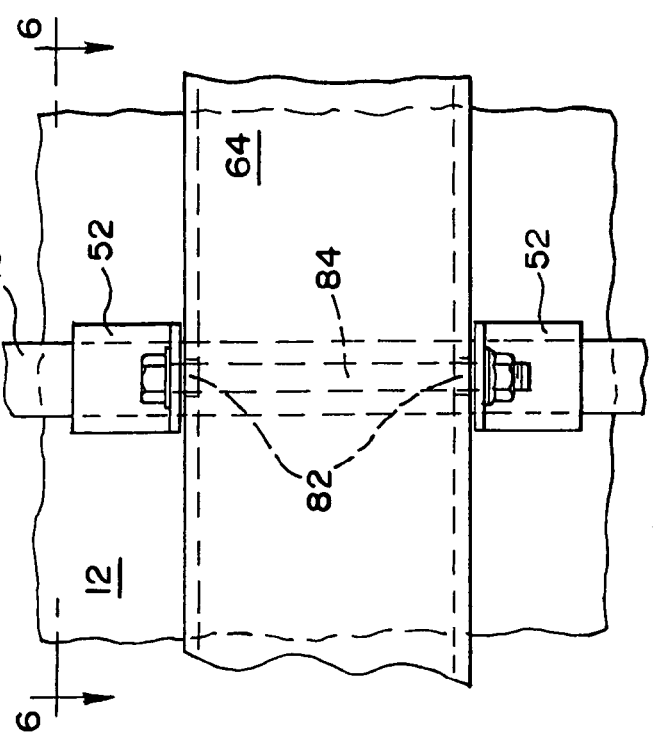
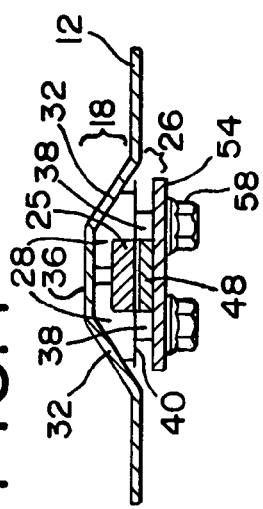
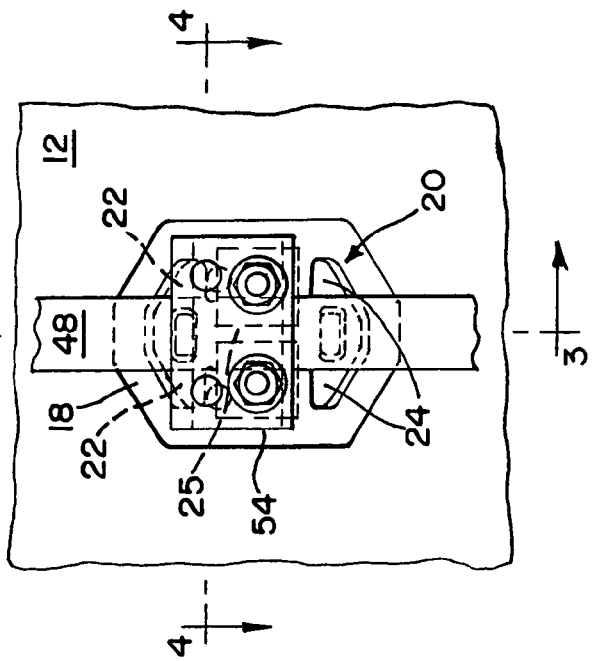
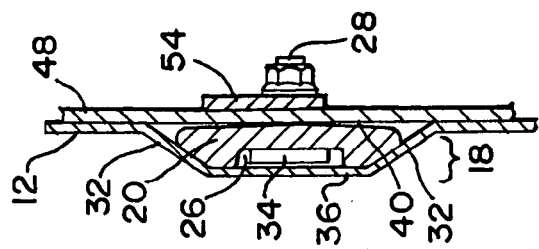

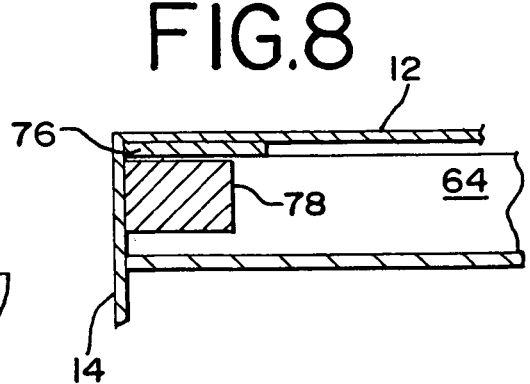
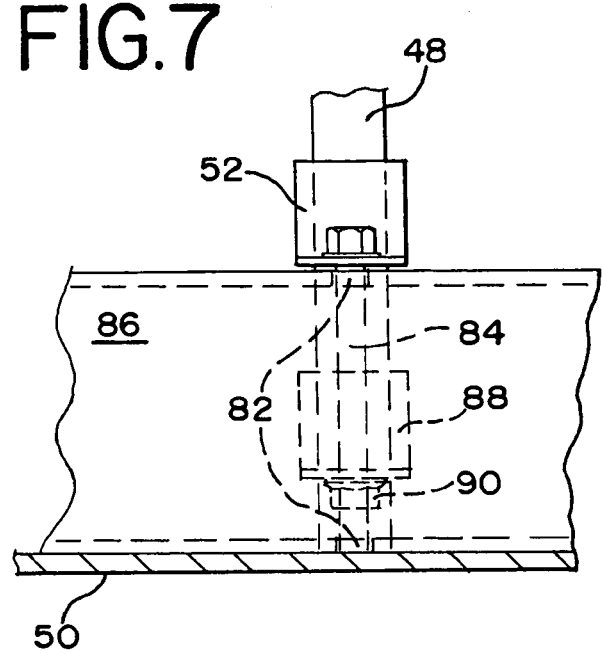
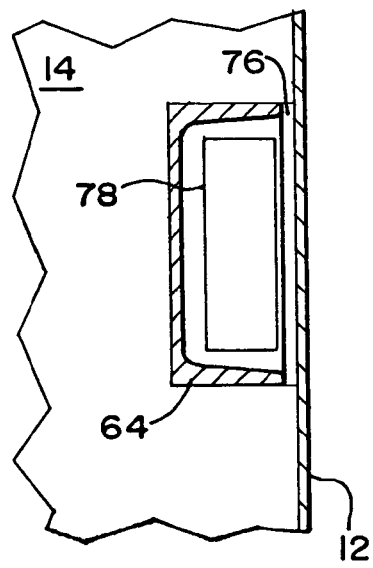
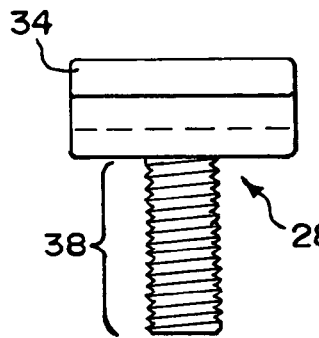
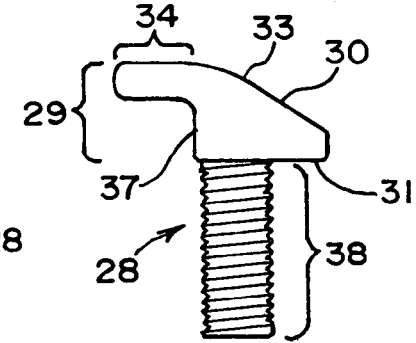
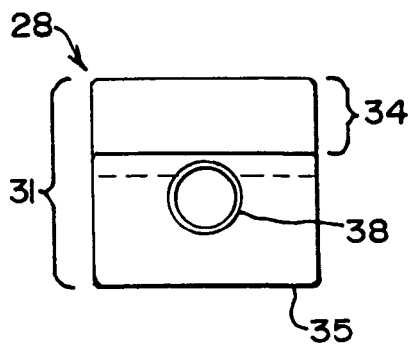
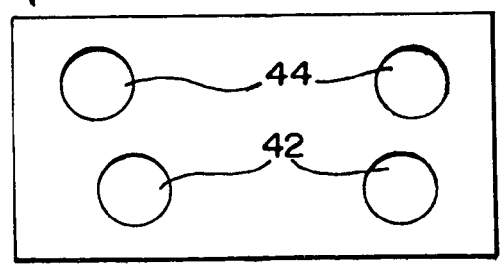

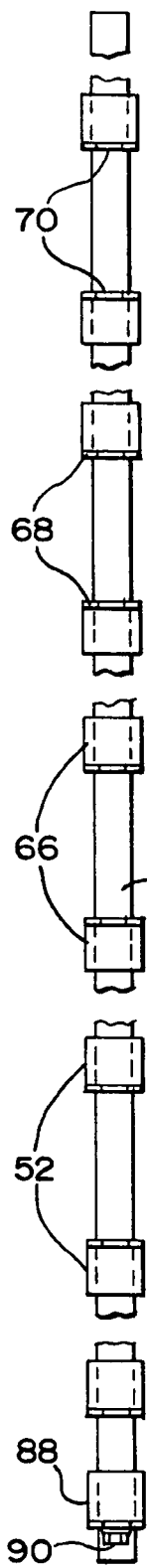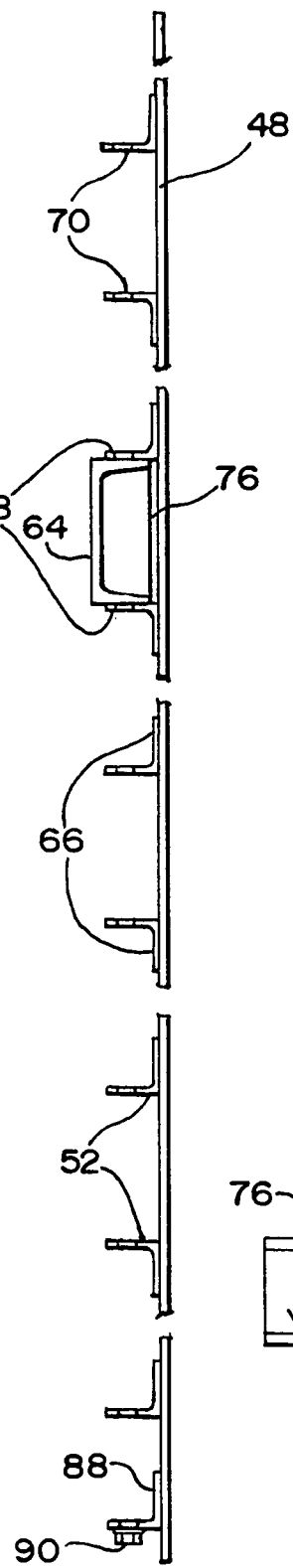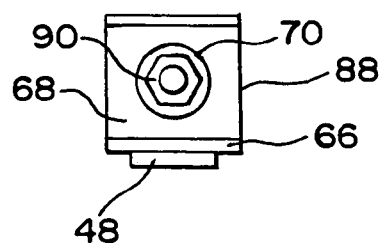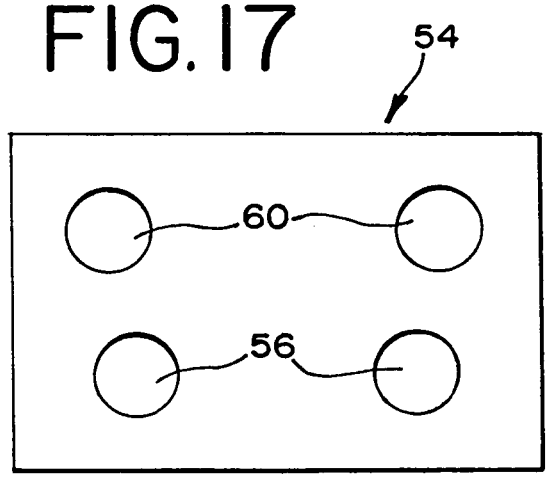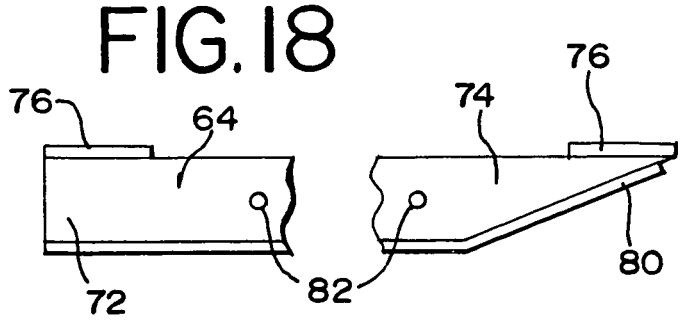

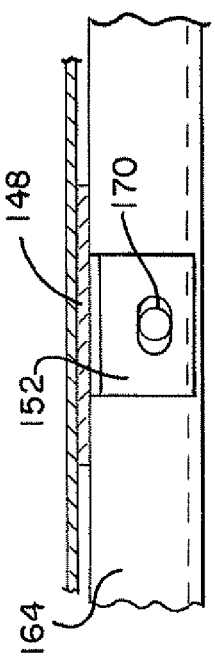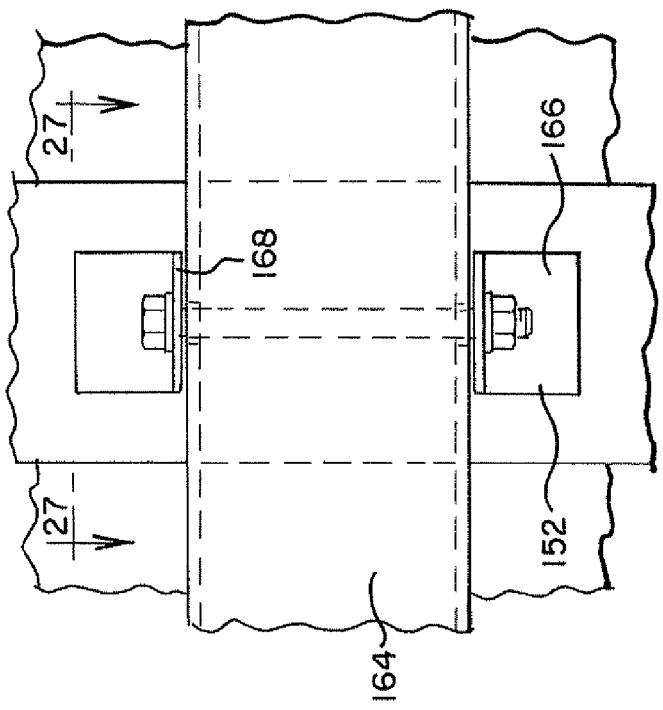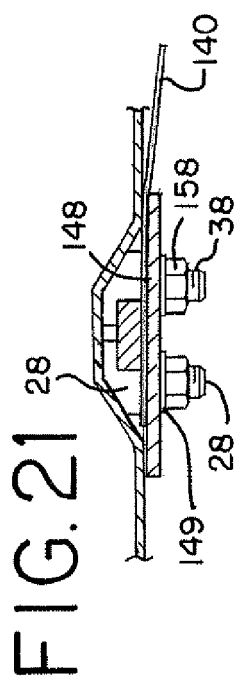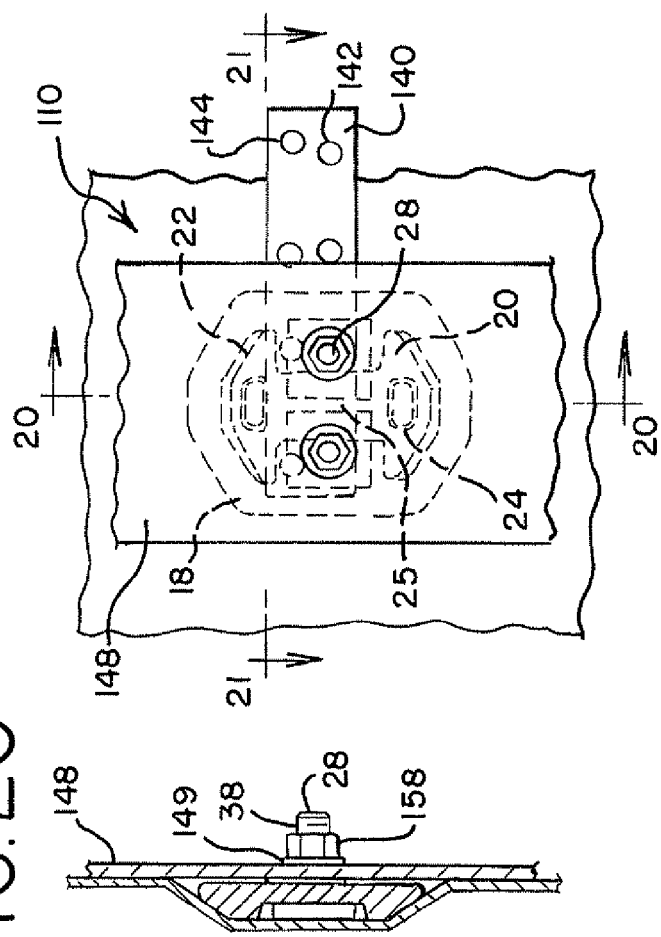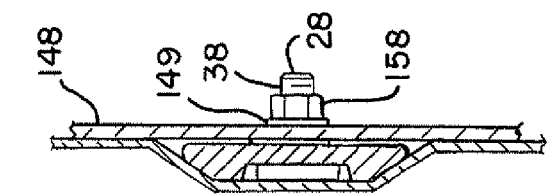

REMOVABLE RUB RAIL SYSTEM FOR RAILWAY CARS

BACKGROUND OF THE INVENTION

1. Field of the Invention

This invention generally relates to a rub rail adapter system for securing cargo in a railway car. An assembly comprising a plurality of lading tie anchor bolts, vertical strips, and attachment members is used to adapt a sidewall having recessed lading tie anchors for the use of rub rails. The assembly is removable, allowing interchangeability between an existing lading tie anchor system and a rub rail system, depending on the cargo to be transported.

2. Description of Related Art

Many types of cargo can be transported by rail, but different protection arrangements and/or securing means are preferable for different types of cargo. Some cargo is best secured by strapping and lading tie anchor systems, whereas other loads are instead typically transported in boxcars and other closed or partially closed units sized to closely accommodate the lading. At times, rub rails are mounted onto the sidewalls, while other known methods can also be used during transport.

Lading tie anchors combine with assorted types of strapping to tie down the cargo or lading in a stationary position, thereby preventing movement during transport. Examples of typical sidewall lading tie anchors can be seen in U.S. Pat. Nos. 3,179,068 and 6,481,941. On the other hand, rub rails are typically affixed to the sidewalls to effectively decrease the width of the car and limit the ability of relatively narrow cargo to shift laterally during transport. An example of a rub rail system can be seen in U.S. Pat. No. 4,064,810.

As can be seen in the above-referenced patents, the sidewalls of the railcars are often configured for a single securing system, e.g. either a lading tie anchor system or a rub rail system. Accordingly, cargo which is typically transported using rub rails, such as containers currently used in the automotive parts industry, must generally be matched with a freight car that utilizes a rub rail system instead of lading tie anchors or some other securing system. Thus, it is desirable to provide an adapter system which allows a single car to accommodate multiple securing systems.

An adapter system directed to this general objective is disclosed in U.S. Pat. No. 3,788,240, which allows a pre-existing lading tie anchor system to accommodate a belt rail support system. One problem with this prior system, however, is that the horizontal rails are affixed directly over the existing lading tie anchors, so the spacing between the rails is not variable. Further, the disclosed system does not allow the lading tie anchor system to accommodate a rub rail system. All references discussed herein are incorporated by reference.

Accordingly, a general object and aspect of the present invention is to provide an adapter system that allows the sidewall of a railway car to accommodate multiple different types of cargo-securing systems.

Another object or aspect of this invention is to provide a removable rub rail system for use with a railway car.

Another object or aspect of the present invention is to provide an adapter system that allows for simple conversion from one cargo-securing system to another and back.

Another object or aspect of this invention is to provide a rub rail system for a railway boxcar that is securely mounted for durable and protective use while also being removable without need for any special tooling.

Other aspects, objects and advantages of the present invention, including the various features used in various combinations, will be understood from the following description according to preferred embodiments of the present invention, taken in conjunction with the drawings in which certain specific features are shown.

SUMMARY OF THE INVENTION

In accordance with the present invention, an adapter system is removably mounted onto components of the existing lading tie anchor system of the sidewalls of a freight car. The adapter system allows the sidewalls to support a rub rail system, when desired, then be easily reconfigured to the original lading tie anchor system, when desired.

A pair of specially configured lading tie anchor bolts ("LTA bolts") fit between an existing lading tie anchor and the corresponding lading tie anchor indentation in the railcar sidewall. A vertical strip is secured between or onto each pair of LTA bolts by mechanical fasteners. The vertical strips include attachment members spaced therealong, which are configured for accommodating horizontal rub rails. A plurality of vertical strips are horizontally spaced apart so as to provide multiple locations of attachment between a rub rail member and the vertical strips.

Notably, the adapter system can be attached and removed with standard hand tools, allowing the railcar to be easily configured from a lading tie anchor system to a rub rail system and back to a lading tie system. Also, the narrower effective width of a boxcar having this system is easily restored to the as-manufactured width of the car. Further, the vertical placement of the rub rails is not dependent on the location of the existing lading tie anchors, but can vary with placement of the attachment members along the vertical strips, and therefore a variety of spacing configurations is available.

BRIEF DESCRIPTION OF THE DRAWINGS

FIG. 1 is a front elevational view of a portion of an inside sidewall of a freight railcar having a rub rail system according to the present invention;

FIG. 2 is a detail view of a representative attachment area of the removable rub rail system of FIG. 1;

FIG. 3 is a left side cross-sectional view along the line 3-3 of FIG. 2;

FIG. 4 is a top cross-sectional view along the line 4-4 of FIG. 2;

FIG. 5 is a detail view of a representative pair of attachment members of FIG. 1 and the surrounding area;

FIG. 6 is a top cross-sectional view along the line 6-6 of FIG. 5;

FIG. 7 is a detail view of a bottom section of the rub rail system of FIG. 1;

FIG. 8 is a top cross-sectional view of a mounting bar and end of a rub rail of the system of FIG. 1;

FIG. 9 is a right side cross-sectional view of the mounting bar of FIG. 8;

FIG. 10 is a right side elevational view of a preferred LTA bolt according to the present invention;

FIG. 11 is a front elevational view of the LTA bolt of FIG. 10;

FIG. 12 is a bottom plan view of the LTA bolt of FIG. 10;

FIG. 13 is a front elevational view of a bolt holder according to the present invention;

FIG. 14 is a front elevational view of a vertical strip according to the present invention, partially broken away;

FIG. 15 is a side elevational view of the vertical strip of FIG. 14;

FIG. 16 is an end elevational view of the vertical strip of FIG. 14;

FIG. 17 is a front elevational view of a compression washer according to the present invention;

FIG. 18 is a side elevational view of a preferred rub rail according to the present invention;

FIG. 19 is a detail view of a representative attachment area of an alternative embodiment of a removable rub rail system;

FIG. 20 is a left side cross-sectional view along the line 20-20 of FIG. 19;

FIG. 21 is a top cross-sectional view along the line 21-21 of FIG. 19;

FIG. 26 is a detail view of a representative pair of attachment members of FIG. 19 and the surrounding area; and FIG. 27 is a top cross-sectional view along the line 27-27 of FIG. 26.

DESCRIPTION OF THE PREFERRED EMBODIMENTS

Figure 23:
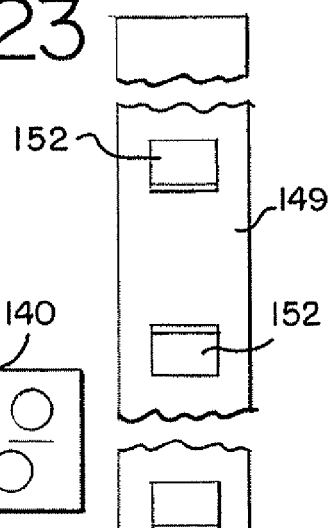
FIG. 23 is a front elevational view of a vertical strip according to this embodiment of the present invention, partially broken away.

As required, detailed embodiments of the present invention are disclosed herein; however, it is to be understood that the disclosed embodiments are merely exemplary of the invention, which may be embodied in various forms. Therefore, specific details disclosed herein are not to be interpreted as limiting, but merely as a basis for the claims and as a representative basis for teaching one skilled in the art to variously employ the present invention and virtually any appropriate manner.

FIG. 1 shows a rub rail adapter system 10 according to the present invention. The rub rail adapter system 10 is affixed to the interior surface of the sidewall 12 of a freight car, between the front or back wall 14 and the door opening 16. As a freight car includes two opposing sidewalls 12, each with a front and a rear portion, each car will typically include a total of four sidewall panel areas, each with a rub rail adapter system 10, depending on the lading or cargo configuration.

The sidewall 12 includes a plurality of indentations 18 which are vertically and horizontally aligned with one another. Each indentation 18 houses a lading tie anchor 20, which are shown in FIGS. 1-4 with "dog bone" or "drainable dog bone" configurations. Some railway boxcars include vertical doorpost strips, such as illustrated at 21 in FIG. 1, having a plurality of tie-securing cross-members 46 which perform a lading-tie anchor function. Generally, such structures provide sites suitable for being adapted to provide the subject removable rub rail system.

As best illustrated in FIG. 2, the lading tie anchor 20 of this embodiment includes two top flanges 22 which are vertically spaced apart from two bottom flanges 24. The top and bottom flanges 22 and 24 are typically spaced from each other by a cross member 25 such that the width of a length of strapping (not shown) can fit therebetween when used to secure lading or cargo. This spacing also has another space 26, which is defined between the lading tie anchor 20 and the corresponding indentation 18 and can be seen in FIGS. 3 and 4.

FIGS. 10-12 show a preferred LTA bolt 28, a pair of which are configured to fit within the space 26, as illustrated in FIG. 4. The shape of this illustrated LTA bolt is well-adapted to be matingly accommodated by a "dog bone" type of anchor, as illustrated, or by a doorpost strip having an indentation and cross-members 46 as discussed herein. Variations in size and/or shape are possible to adapt the basic LTA bolt structure that is illustrated, depending on the specific size and shape of a particular anchor arrangement.

The head portion 29 of the LTA bolt 28 that is illustrated in FIGS. 10-12 includes an inside face 31 and an outer surface 33. The inside face 31 has a perimeter surface 35 from which a threaded portion 38 extends. The outer surface 33 has an angled portion 30 and a narrow portion 34. The angled portion 30 provides a tapered surface that matches a receding portion 32 of the indentation 18 associated with the illustrated lading tie anchor 20, illustrated therein as a sloped wall. Although the indentation 18 illustrated in FIGS. 1-4 has a straight, sloped portion 32, other profiles exist, and the head portion 29 of the LTA bolt 28 can be modified to fit those other profiles. The narrow portion 34 is configured to fit closely between the cross member 25 of the lading tie anchor 20 and a parallel wall 36 of the associated indentation 18. The narrow portion 34 may be defined in part by a notch 37 which generally conforms to the shape of at least a portion of the cross member 25. Hence, two LTA bolts 28 are inserted into the space 26, such that their threaded portions 38 extend from the inside face 31 of the LTA bolt 28 toward the interior of the freight car, at opposite lateral sides of the lading tie anchor 20.

The LTA bolts 28 only need be applied to selected lading tie anchors 20, because it has been found that typically all are not needed to adequately secure the adapter system 10. For example, FIG. 1 shows LTA bolts 28 being applied to only four lading tie anchors 20 in each vertical row, with the vertical row closest to the door opening 16 having no LTA bolts 28 whatsoever. Of course, more or fewer LTA bolts 28 may be applied depending on the freight car and cargo configuration and objectives and preferences of the installer.

In order to temporarily secure the two LTA bolts 28, a bolt holder 40, as shown in FIG. 13, preferably is provided. The illustrated bolt holder 40 includes four identical bolt holes 42 and 44. Bolt holes 42 are spaced apart and sized to fit over the threaded portions 38 which extend beyond the lading tie anchor 20. Typically the bolt holder 40 need not be a permanent member, but can be made of a degradable material such as paperboard or cardboard. As illustrated in FIGS. 1-4, the bolt holder 40 is placed onto the extending threaded portions 38, thereby temporarily securing the LTA bolts 28 while others are being attached elsewhere. Bolt holes 44 are spaced apart for use with the doorpost strip anchors 46, as discussed below.

The exact configuration of the bolt holder 40 is not critical, and any configuration which can temporarily support a pair of LTA bolts 28 is sufficient. For example, instead of individual holes, the bolt holder can include an opening in the shape of an elongated slot. The slot is preferably adapted to accommodate a wide range of LTA bolt spacing arrangements, such that it can be used with different LTA bolts 28, lading tie anchors 20, and doorpost strip anchors 46.

Once the LTA bolts 28 and bolt holders 40 have been applied to the lading tie anchors 20 in one vertical row, a vertical strip 48 of durable material, such as strong polymer or metal, is inserted between the extending threaded portions 38. FIGS. 14 and 15 show a vertical strip 48 apart from the rest of the system, while FIGS. 1-4 show the vertical strip 48 inserted on top of the bolt holders 40 and between the two threaded portions 38. The vertical strip 48 preferably is configured to fit snugly between the two threaded portions 38; otherwise misalignment is possible. As shown in FIG. 3, the vertical strip 48 preferably sits flush against the sidewall 12. The bottom of the vertical strip 48 can rest upon the floor 50 of the car, as illustrated in FIGS. 1 and 7. Each vertical strip 48 includes a plurality of attachment members 52, which will be discussed below.

Once each vertical strip 48 has been set in place, it is secured by a plurality of compression washers 54, one of which is illustrated in FIG. 17. It will be seen that the illustrated compression washers 54 are similar in design to the bolt holders 40. They are made of a durable material, such as a strong polymer or metal. As shown in FIGS. 1-4, the bolt holes 56 are spaced apart and sized to fit over the threaded portions 38 which extend beyond the lading tie anchor 20, bolt holder 40, and vertical strip 48. As illustrated in FIGS. 1-4, the compression washer 54 is placed onto the extending threaded portions 38, thereby covering the vertical strip 48. Finally, removable members 58 are applied to the threaded portions 38. The removable members 58 take the form of standard nuts in the illustrated embodiment. Bolt holes 60 are spaced apart by a different distance, which may be suitable for use with the doorpost strip anchors 46, as discussed herein. The exact configuration of the compression washer 54 is not critical, provided that it can support a pair of LTA bolts 28, as described herein.

As shown in FIG. 1, adjacent the door opening 16 is a doorpost strip 21, which is associated with a vertical indentation in the railcar sidewall (not shown). The doorpost strip 21 includes a plurality of anchor portions 46 which function similarly to the discrete lading tie anchors 20 disposed elsewhere along the sidewall 12. The same or very similar LTA bolts 28 used with the lading tie anchors 20 also can be used with the doorpost strip anchors 46 and applied in the manner described above. However, the doorpost strip anchors 46 may be differently sized, such as being wider than the lading tie anchors 20, so the extending threaded portions 38 may be spaced farther apart than when the LTA bolts 28 are used with the lading tie anchors 20. Accordingly, holes 44 are provided in the bolt holder 40, which are spaced farther apart than holes 42. As such, the same bolt holder 40 may be used with the lading tie anchors 20, the doorpost strip anchors 46, or other anchor arrangements.

Similarly, holes 60 are provided in the compression washer 54. Also, for the wider spacing arrangements, a wider vertical strip is provided in order to ensure a snug fit between the extending threaded portions 38. Otherwise, the same process described above with respect to the lading tie anchors 28 is equally applicable to the doorpost strip anchors 46. Of course, if the doorpost strip anchors 46 have a width equal to that of the lading tie anchors, then bolt holes 42 and 56 and vertical strip 48 can be used instead.

Each vertical strip 48 includes a plurality of attachment members 52, which are illustrated as angle brackets in FIGS. 14-16. The attachment members 52 are preferably disposed in spaced-apart pairs, which each accommodate a rub rail 64, as shown in FIGS. 1, 5, and 6. The paired attachment members 52 can be spaced generally anywhere along the vertical strip 48 but, according to a preferred embodiment, the attachment members 52 are located such that the rub rails 64 are at heights other than those of the lading tie anchors 20 present in the car. For example, the rub rails 64 can be just above or just below the lading tie anchor locations, they can be midway between the lading tie anchor locations, or any convenient location therebetween. In a preferred embodiment five rub rails 64 are provided, and these are approximately thirty inches apart from each other. Other numbers and spacings are possible, depending upon the particular needs of lading to be accommodated by the removable rub rail system.

The illustrated angle brackets 52 have a first portion 66 which is welded to the vertical strip 48. A second portion 68 extends perpendicularly from the first portion 66 and includes a bolt hole 70. The bolt hole 70 of each angle bracket 52 is oriented to be in alignment with the bolt hole 70 of the angle bracket 52 with which it is paired and with the vertical strip 48.

While the attachment members 52 of the preferred embodiment are welded onto the vertical strips 48 in pairs, that aspect is not critical to the present invention. For example, one or more of the attachment members may be integrally formed with the vertical strip, which is especially applicable when the vertical strip is manufactured of a strong polymer.

Once all of the vertical strips 48 are secured to the sidewall 12, a rub rail 64 is attached to the attachment member or members, such as being inserted between each pair of attachment members 52 which may take the form of angle brackets. If paired attachment members are not used, then it is possible to removably secure each rub rail 64 to a single attachment member of each vertical strip 48, rather than requiring a pair of attachment members. As illustrated in FIG. 18, the rub rail 64 of this embodiment takes the general shape of a channel. At both the corner portion 72 and door portion 74 of the rub rail 64, the opening of the channel is preferably covered by durable strips 76. The vertical strips 48 preferably sit flush with the sidewall 12, so the durable strips 76 must be thick enough to allow the rub rails 64 to clear the vertical strips 48. Preferably the durable strips 76 have the same thickness as vertical strips 48 in order to provide optimal alignment. Furthermore, door portion 74 includes chamfered portion 80 because it is located adjacent the door opening 16, and such a configuration reduces the chance cargo would be caught on or otherwise engage the rub rail 64 when it is first loaded into the car. Finally, the rub rail 64 includes bolt holes 82 which are intended to align with the bolt holes 70 of the attachment member or members 52.

FIGS. 1, 8, and 9 show optional mounting bars 78. The lading tie anchors 20 closest to the front or back wall 14 are typically about five feet away from the wall 14, so the mounting bars 78 are intended to prevent any cantilevering effect on the rub rails 64 during lading and transport. Each mounting bar 78 is vertically aligned with a row of angle brackets 52 and welded to the front or back wall 14, typically slightly offset from the sidewall 12. The mounting bar 78 is sized such that it will fit within the channel of the rub rail 64.

In the preferred embodiment, a rub rail 64 is fit between a pair of angle brackets 52, then slid toward the rear of the car, such that the durable strip 76 at corner portion 72 fits between the sidewall 12 and the mounting bar 78, as shown in FIGS. 8 and 9. FIG. 6 shows that the rub rail end surface 65 extends further into the interior of the car than the angle bracket end edge 53, which prevents damage to the cargo by the end edge 53 when the cargo contacts the rub rails 64 during loading or transport. As the durable strip 76 is designed to slide behind mounting bar 78, the mounting bar 78 should be offset from the sidewall 12 a distance at least equal to the thickness of the durable strip 76. Preferably, the distance between the mounting bar 78 and the sidewall 12 is such that the durable strip 76 fits snugly therebetween when slid into place. Finally, when the rub rail 64 is in place with bolt holes 70 and 82 aligned, the rub rail 64 is secured with a removable member, which can take the form of a standard mechanical fastener such as bolt 84, as shown in FIGS. 5 and 6.

FIG. 7 shows that the lowermost rub rail 86 rests on the floor 50 of the car. As it is not desirable to drill a bolt hole into the floor 50, a shortened angle bracket 88, illustrated in FIG. 15, preferably is located along the vertical strip 48 such that it fits within the channel of the lowermost rub rail 86. A lock nut 90 is preferably tack welded onto the shortened angle bracket 88, and a standard bolt applied to the lock nut 90 secures the lowermost rub rail 86.

The adapter system 10 of FIG. 1 shows five rub rails 64 which are equally spaced apart, but a different number of rub rails 64 and different vertical spacing is possible. This includes locating the rub rails between adjacent anchor sets or omitting one or more rub rails at locations between selected anchor sets.

If it is desired to remove the rub rail adapter system 10, then the above process is simply reversed and the car is reconfigured to support the pre-existing lading tie anchor system and to reinstate the railcar to its original effective width and cargo volume. It will be appreciated that the rub rail adapter system 10 can be easily applied and removed with standard hand tools.

FIG. 19 shows an alternate rub rail adapter system 110 according to the present invention. The rub rail adapter system 110 is affixed to the interior surface of the sidewall 12 of a freight car, between the front or back wall 14 and the door opening 16. As a freight car includes two opposing sidewalls 12, each with a front and a rear portion, each car will typically include a total of four sidewall panel areas, each with a rub rail adapter system 110

Figure 22:
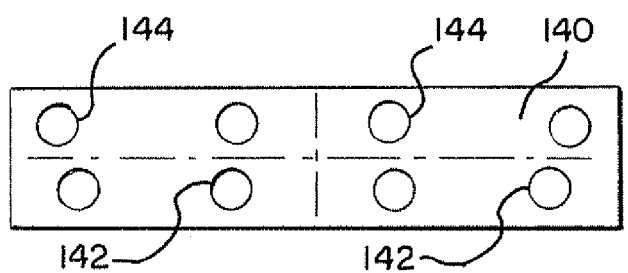
FIG. 22 is a front elevational view of a bolt holder and hole template according to the embodiment of FIG. 19.

In order to temporarily secure the two LTA bolts 28 and facilitate proper hole positioning and installation of the vertical strips of this embodiment, a bolt holder and hole template 140, as shown in FIG. 22, preferably is provided. The illustrated holder and template 140 includes four pairs of bolt holes 142 and 144. Bolt holes 142 are spaced apart and sized to fit over the threaded portions 38 which extend beyond the lading tie anchor 20. Typically the holder and template 140 need not be a permanent member, but can be made of a degradable material such as paperboard or cardboard.

As illustrated in FIG. 19, the holder and template 140 is placed onto the extending threaded portions 38, thereby temporarily securing the LTA bolts 28 while performing a hole template function for properly locating holes in the vertical strips. Bolt holes 144 are spaced apart for use with the door-post strip anchors 46, as discussed herein. The right half of the holder and template 140 projects beyond the bolts 28, as seen in FIG. 19. These holes 142, 144 are positioned such that the installer can slide a vertical strip 148 behind the holder and template 140 and mark onto the strip 148 the proper location for holes 149 in or to be drilled into the strip 148 so that when the strip 148 is installed in the proper location as shown in FIG. 19, the holes 149 properly line up with the extending threaded portions 38 of the bolts 28.

Figure 24:
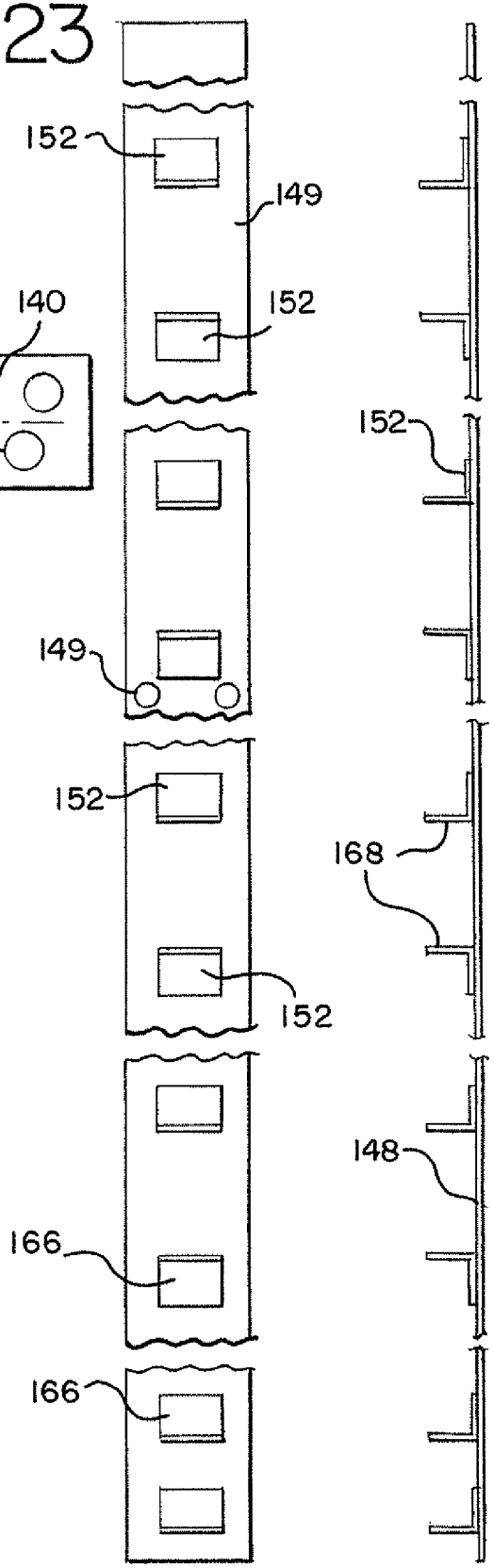
FIG. 24 is a side elevational view of the vertical strip of FIG. 23.
Figure 25:
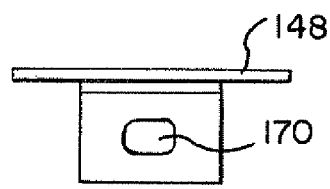
FIG. 25 is an end elevational view of the vertical strip of FIG. 23.

Once the LTA bolts 28 and bolt holders and templates 140 have been applied to the lading tie anchors 20 in one vertical row, a vertical strip 148 of durable material, such as strong polymer or metal, is inserted over the extending threaded portions 38, which pass through holes 149. FIGS. 23, 24 and 25 show a vertical strip 148 apart from the rest of the system, while FIGS. 19-21 show the vertical strip 148 inserted into the assembly. The vertical strip 148 preferably is configured to fit entirely over the anchors 20. As shown in FIG. 20, the vertical strip 148 preferably sits flush against the sidewall 12. The bottom of the vertical strip 148 can rest upon the floor 50 of the car. Each vertical strip 148 includes a plurality of attachment members 152.

Once each vertical strip 148 has been set in place, it is secured by a plurality of removable members 158 are applied to the threaded portions 38. The removable members 58 take the form of standard nuts in the illustrated embodiment.

Each vertical strip 148 includes a plurality of attachment members 152, which are illustrated as angle brackets in FIGS. 23-25. The attachment members 152 are preferably disposed in spaced-apart pairs, which each accommodate a rub rail 164, as shown in FIGS. 26 and 27. The paired attachment members 152 can be spaced generally anywhere along the vertical strip 148 but, according to a preferred embodiment, the attachment members 152 are located such that the rub rails 164 are at heights spaced from those of the lading tie anchors 20 present in the car. Typically, there are between about three and about seven rub rails, and these typically are between approximately twenty inches and approximately forty inches apart from each other.

The illustrated angle brackets 152 have a first portion 166 which is welded to the vertical strip 148. A second portion 168 extends perpendicularly from the first portion 166 and includes a bolt hole 170. The bolt hole 170 of each angle bracket 152 is oriented to be in alignment with the bolt hole 170 of the angle bracket 152 with which it is paired and with the vertical strip 148.

While the attachment members 152 of the preferred embodiment are welded onto the vertical strips 148 in pairs, that aspect is not critical to the present invention. For example, one or more of the attachment members may be integrally formed with the vertical strip, which is especially applicable when the vertical strip is manufactured of a strong polymer.

Once all of the vertical strips 148 are secured to the sidewall 12, a rub rail 164 is attached to the attachment member or members, such as being inserted between each pair of attachment members 152 which may take the form of angle brackets. If paired attachment members are not used, then it is possible to removably secure each rub rail 164 to a single attachment member of each vertical strip 148, rather than requiring a pair of attachment members. As illustrated in FIGS. 26 and 27, the rub rail 164 of this embodiment takes the general shape of a channel.

It will be understood that the embodiments of the present invention which have been described are illustrative of some of the applications of the principles of the present invention. Numerous modifications may be made by those skilled in the art without departing from the true spirit and scope of the invention, including those combinations of features that are individually disclosed or claimed herein.

The invention claimed is:

1. A removable rub rail adapter system for a sidewall of a railway freight car having recessed lading tie anchors arranged in vertical rows comprising:

a plurality of paired lading tie anchor bolts arranged in vertical rows, each lading tie anchor bolt having a threaded portion and a head configured to fit between one of said lading tie anchors and said sidewall of said railway car, wherein the heads of each pair of lading tie anchor bolts are inserted in a readily removable fashion at opposite sides of one of said lading tie anchors such that said threaded portions are spaced a selected distance apart from one another and extend away from the sidewall;

a plurality of vertical strips, each vertical strip being held in place in a readily removable fashion by a vertical row of said lading tie anchor bolts, wherein each vertical strip includes a plurality of attachment members arranged in horizontal alignment with an attachment member of an adjacent vertical strip; and a plurality of rub rails, each rub rail being held in place in a readily removable fashion by a horizontal row of said attachment members.

2. The removable rub rail adapter system of claim 1, wherein said lading tie anchor bolts, vertical strips, and rub rails are capable of being applied and removed with standard hand tools.

3. The removable rub rail adapter system of claim 1, wherein said selected distance apart is substantially the same as the width of said vertical strips.

4. The removable rub rail adapter system of claim 1, further including a bolt holder configured and positioned for engagement with the threaded portions of a pair of lading tie anchor bolts, said bolt holder underlying said vertical strip at said bolts.

5. The removable rub rail adapter system of claim 1, further including a compression washer positioned over one of said vertical strips and configured for engagement with the threaded portions of one of said pairs of lading tie anchor bolts.

6. The removable rub rail adapter system of claim 1, wherein said rub rails include a chamfered portion that is inclined toward a doorway of the railway car.

7. The removable rub rail adapter system of claim 1, further including a channel in the rub rail and a durable strip covering a portion of said channel, wherein said durable strip has a thickness substantially the same as the thickness of said vertical strips.

8. The removable rub rail adapter system of claim 1, further including a mounting bar welded to a front or back wall of the railway car, said mounting bar associated with one of said rub rails and sized to fit within said rub rail.

9. The removable rub rail adapter system of claim 8, said rub rail including a channel and a durable strip covering a portion of said channel, wherein said durable strip is configured to fit between said mounting bar and a sidewall of the railway car.

10. The removable rub rail adapter system of claim 1, wherein a short attachment member fits within a lowermost one of said rub rails and is configured to receive a mechanical fastener for securing said lowermost rub rail.

11. The removable rub rail adapter system of claim 1, wherein said attachment members comprise angle brackets that are vertically spaced from one another, and each rub rail is held between a pair of said angle brackets.

12. The removable rub rail adapter system of claim 11, further including an angle bracket edge and a rub rail end surface, wherein said rub rail end surface extends a greater distance into an interior of the railway freight car than said angle bracket edge.

13. The removable rub rail adapter system of claim 1, further including a bolt holder and hole template which has holes which accommodate each lading tie anchor bolt and additional holes which provide a template location for holes of said vertical strip while said bolt holder and hole template is positioned on said lading tie anchor bolts.

14. A lading tie anchor bolt for use with a recessed lading tie anchor having a cross member associated with a railway freight car sidewall having an indentation with a receding portion, the lading tie anchor bolt comprising:
   a head portion and a threaded shaft portion extending from an inside surface of said head portion;
   said head portion having a perimeter that extends transversely beyond said threaded portion;
   said head portion has an outer surface facing opposite of said inside surface, said outer surface including an angled portion that provides a tapered surface configured for mateable engagement with the receding portion of the recessed lading tie anchor of the railway freight car sidewall; and
   said head portion further has a narrow portion sized and configured to fit closely between the indentation of the railway freight car sidewall and the cross member of the recessed lading tie anchor.

15. The lading tie anchor bolt of claim 14, further including a notch in said inside surface, wherein said narrow portion is defined in part by said notch.

16. The lading tie anchor bolt of claim 15, wherein said notch is sized and configured to accommodate the cross member of the recessed lading tie anchor.

17. A method of adapting a sidewall of a railway freight car having a plurality of indentations and associated cross members, comprising:
   inserting a pair of lading tie anchor bolts between one of said cross members and the associated indentation of a sidewall of the railway freight car, such that a threaded portion of each lading tie anchor bolt extends away from the sidewall;
   providing a plurality of vertical strips having a plurality of attachment members;
   inserting the vertical strip between said threaded portions of the pair of lading tie anchor bolts;
   securing said vertical strip to said threaded portions with one or more removable members;
   positioning a horizontal rub rail onto an attachment member of the plurality of vertical strips; and
   removably securing the horizontal rub rail to the attachment member, thereby reducing the effective width of a cargo-accommodating interior of the railway freight car.

18. The method of claim 17, wherein positioning said horizontal rub rail includes welding a mounting bar to a wall of the railway freight car and sliding the horizontal rub rail until the mounting bar is covered by the horizontal rub rail.

19. The method of claim 17, wherein inserting the pair of lading tie anchor bolts includes covering the threaded portions with a bolt holder prior to inserting the vertical strip.

20. The method of claim 17, wherein securing the vertical strips includes covering the vertical strips and threaded portions with a compression washer prior to positioning the rub rail.

21. A method of adapting a sidewall of a railway freight car having a horizontal rub rail secured by a first removable member to an attachment member of a vertical strip secured to the sidewall by a second removable member and lading tie anchor bolts, comprising:
   removing the first removable member which is removably securing the horizontal rub rail within the railway freight car;
   detaching the horizontal rub rail from the attachment member;
   removing the second removable member from said lading tie anchor bolt;
   detaching the vertical strip from the lading tie anchor bolt; and
   removing the lading tie anchor bolts from a lading tie anchor of the railway freight car, thereby increasing the effective width of a cargo-accommodating interior of the railway freight car.

\* \* \* \* \*

UNITED STATES PATENT AND TRADEMARK OFFICE
CERTIFICATE OF CORRECTION

PATENT NO. : 7,435,044 B2  
APPLICATION NO. : 11/116838  
DATED : October 14, 2008  
INVENTOR(S) : Nadherny et al.

Page 1 of 1

It is certified that error appears in the above-identified patent and that said Letters Patent is hereby corrected as shown below:

Col. 3, line 37, "and" should read --in--.  
Col. 5, line 48, delete the period after "strip anchors".  
Col. 7, line 65, insert --, which-- after "removable members 158".

Signed and Sealed this

Seventeenth Day of February, 2009

JOHN DOLL  
*Acting Director of the United States Patent and Trademark Office*